(12) United States Patent
Rubel et al.

(10) Patent No.: US 12,702,129 B2
(45) **Date of Patent: *Aug. 11, 2026**

(54) INSECT REPELLANT DEVICE WITH SIMULATED FLAME

(71) Applicant: PIC Corporation, Linden, NJ (US)

(72) Inventors: Eric Rubel, Westfield, NJ (US); David L. Lowe, Port Monmouth, NJ (US); Lawrence E. Bradford, Scotch Plains, NJ (US)

(73) Assignee: PIC Corporation, Clark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/088,397

(22) Filed: Mar. 24, 2025

(65) Prior Publication Data

US 2025/0212869 A1 Jul. 3, 2025

Related U.S. Application Data

(63) Continuation of application No. 18/422,614, filed on Jan. 25, 2024, now Pat. No. 12,285,002.

(60) Provisional application No. 63/441,372, filed on Jan. 26, 2023.

(51) Int. Cl.

| | |
|---|---|
| ***A01M 29/12*** | (2011.01) |
| ***A01M 1/20*** | (2006.01) |
| ***F21S 10/04*** | (2006.01) |
| ***F21V 33/00*** | (2006.01) |

(52) U.S. Cl.

CPC .......... *A01M 29/12* (2013.01); *A01M 1/2077* (2013.01); *F21S 10/043* (2013.01); *F21V 33/0004* (2013.01)

(58) Field of Classification Search

CPC ................................ F21S 10/043; A01M 1/20

See application file for complete search history.

(56) References Cited

U.S. PATENT DOCUMENTS

| | | | | |
|---|---|---|---|---|
| 11,002,417 | B2 * | 5/2021 | Rubel | A01M 1/22 |
| 11,293,610 | B2 * | 4/2022 | Rubel | F21S 9/037 |
| 2006/0115386 | A1 | 6/2006 | Michaels et al. | |
| 2013/0114244 | A1 | 5/2013 | Formico et al. | |
| 2013/0200172 | A1 | 8/2013 | Downer | |
| 2014/0035483 | A1 | 2/2014 | Becker et al. | |
| 2014/0362560 | A1 | 12/2014 | Formico et al. | |
| 2015/0144713 | A1 | 5/2015 | Formico et al. | |
| 2018/0325097 | A1 | 11/2018 | Formico et al. | |
| 2018/0343846 | A1 | 12/2018 | Horne | |
| 2019/0257487 | A1 * | 8/2019 | Green, Jr. | F21V 3/061 |
| 2019/0281810 | A1 | 9/2019 | Sinur et al. | |
| 2020/0072426 | A1 * | 3/2020 | Howard | F21V 23/003 |
| 2020/0085033 | A1 | 3/2020 | Rubel | |
| 2020/0240604 | A1 * | 7/2020 | Patton | F21V 3/0625 |
| 2020/0340638 | A1 | 10/2020 | Rubel | |
| 2021/0148562 | A1 | 5/2021 | Sawalski et al. | |

(Continued)

OTHER PUBLICATIONS

International Search Report and Written Opinion dated May 8, 2024, issued in PCT International Application No. PCT/US2024/012922.

*Primary Examiner* — Alexander K Garlen

(74) *Attorney, Agent, or Firm* — Amster, Rothstein & Ebenstein LLP

(57) ABSTRACT

An insect repellant device including a repellant portion and a light portion with a simulated flame and constant light option.

21 Claims, 15 Drawing Sheets

(56) References Cited

U.S. PATENT DOCUMENTS

| | | | | |
|---|---|---|---|---|
| 2021/0247043 | A1* | 8/2021 | Patton | .................. F21S 10/043 |
| 2022/0022442 | A1 | 1/2022 | Studer et al. | |

* cited by examiner

200

12

10

16

80

W

114

INSECT REPELLANT DEVICE WITH SIMULATED FLAME

CROSS-REFERENCE TO RELATED APPLICATIONS

The present application is a continuation of U.S. patent application Ser. No. 18/422,614, filed Jan. 25, 2024, which claims priority to and benefit of U.S. Provisional Patent Application No. 63/441,372, filed Jan. 26, 2023, entitled INSECT REPELLANT DEVICE WITH SIMULATED FLAME, the entire content of which is incorporated by reference herein.

BACKGROUND

Field of the Disclosure

The present invention relates to an insect repellant device including a light element providing a simulated flame.

Related

Conventional insect repelling devices typically utilize a chemical repellant and may be a candle or otherwise utilize a flame to vaporize the repellant material to provide an area of vaporized repellant around the device. The use of open flames results both in inconsistent dispersal of repellant as well as the danger of fire. Since many nuisance insects are active at night or in the early evening, conventional devices that utilize a flame provide an advantage in that the use of the flame may also provide light for users to see, however, the use of an open flame provides unreliable light and includes the inherent dangers discussed above.

Accordingly, it would be beneficial to provide an insect repellant device that avoids these and other problems.

SUMMARY

It is an object of the present disclosure to provide an insect repellant device including a light element providing a simulate flame appearance to provide lighting as well as aesthetically pleasing appearance.

An insect repellant device in accordance with an embodiment of the present disclosure includes: a stake configure to be removably inserted into the ground; a post extending upward from the stake; a repellant portion mounted in a top of the post and including an insect repellant and configured to disperse vaporized insect repellant around the insect repellant device; a light portion mounted on top of the repellant portion, the light portion including a plurality of flickering light sources configured to simulate a flame; and a control circuit operably connected to the repellant portion and the light portion to control activation of the repellant portion to provide vaporized insect repellant and the plurality of flickering light sources to provide light.

In embodiments, at least one power source is operably connected to one or more of the control circuit, the light portion and the repellant portion.

In embodiments, the plurality of flickering light sources may include: a first group of flickering light sources that are controlled by the control circuit to turn on and off together; a second group of flickering light sources that are controlled by the control circuit to dim and brighten together, wherein the second group of flickering light sources are positioned below the first group of flickering light sources.

In embodiments, the light portion includes at least one constant light source configured to provide substantially constant light.

In embodiments, the control circuit is operably connected to the plurality of flickering light sources and the at least one constant light source to activate the flickering light sources to simulate the flame while the constant light source is off.

In embodiments, the control circuit is operably connected to the flickering light sources and the at least one constant light source to activate the constant light source to provide constant light while the plurality of flickering light sources are off.

In embodiments, the repellant portion includes: a repellant housing; a heating element mounted in the repellant housing; a power terminal mounted in the repellant housing and electrically connected to the heating element; an insect repellent cartridge including insect repellent mounted in the repellant housing, the insect repelling cartridge including: a top portion configured to be received in an opening formed in the repellant housing; and a wick extending above the top portion and in contact with the insect repellant, wherein a top of the wick is positioned adjacent to the heating element.

In embodiments, a base may be provided between the post and the repellant portion, wherein the repellant portion is removably mounted on the base to allow access to the insect repellant cartridge.

In embodiments, at least one release button may be provided in the base and configured to allow separation of the base and the repellant portion.

In embodiments, the stake may include a wire guide configured to receive a wire and the post includes a hollow central chamber configured to allow the wire to extend up from the stake to the power terminal of the repellant portion.

In embodiments, an insect repellant device in accordance with an embodiment of the present disclosure includes: a stand; a post extending upward from the stand; a repellant portion mounted on a top of the post and including an insect repellent and configured to disperse vaporized insect repellent around the insect repellant device; a light portion mounted on top of the repellant portion, the light portion including a plurality of flickering light sources configured to simulate a flame; and a control circuit operably connected to the repellant portion and the light portion to control activation of the repellant portion to provide vaporized insect repellant and the plurality of flickering light sources to provide light.

In embodiments, at least one power source operably connected to one or more of the control circuit, the light portion and the repellant portion.

In embodiments, the plurality of flickering light sources include: a first group of flickering light sources that are controlled by the control circuit to turn on and off together; a second group of flickering light sources that are controlled by the control circuit to dim and brighten together, wherein the second group of flickering light sources are positioned below the first group of flickering light sources.

In embodiments, the light portion further comprises at least one constant light source configured to provide substantially constant light.

In embodiments, the control circuit is operably connected to the plurality of flickering light sources and the at least one constant light source to activate the flickering light sources to simulate the flame while the constant light source is off.

In embodiments, the control circuit is operably connected to the flickering light sources and the at least one constant light source to activate the constant light source to provide constant light while the plurality of flickering light sources are off.

In embodiments, the repellant portion further includes: a repellant housing; a heating element mounted in the repellant housing; a power terminal mounted in the repellant housing and electrically connected to the heating element; an insect repellant cartridge including insect repellent mounted in the repellant housing, the insect repelling cartridge including: a top portion configured to be received in an opening formed in the repellant housing; and a wick extending above the top portion and in contact with the insect repellent, wherein a top of the wick is positioned adjacent to the heating element.

An insect repellant device in accordance with an embodiment of the present disclosure includes: a deck clip; a post extending upward from the deck clip; a repellant portion mounted in a top of the post and including an insect repellant and configured to disperse vaporized insect repellant around the insect repellant device; a light portion mounted on top of the repellant portion, the light portion including a plurality of flickering light sources configured to simulate a flame; and a control circuit operably connected to the repellant portion and the light portion to control activation of the repellant portion to provide vaporized insect repellant and the plurality of flickering light sources to provide light.

In embodiments, at least one power source operably connected to one or more of the control circuit, the light portion and the repellant portion.

In embodiments, the plurality of flickering light sources include: a first group of flickering light sources that are controlled by the control circuit to turn on and off together; a second group of flickering light sources that are controlled by the control circuit to dim and brighten together, wherein the second group of flickering light sources are positioned below the first group of flickering light sources.

In embodiments, the light portion further comprises at least one constant light source configured to provide substantially constant light.

In embodiments, the control circuit is operably connected to the plurality of flickering light sources and the at least one constant light source to activate the flickering light sources to simulate the flame while the constant light source is off.

In embodiments, the control circuit is operably connected to the flickering light sources and the at least one constant light source to activate the constant light source to provide constant light while the plurality of flickering light sources are off.

BRIEF DESCRIPTION OF THE DRAWINGS

The above and related objects, features and advantages of the present disclosure will be more fully understood by reference to the following, detailed description of the preferred, albeit illustrative, embodiments of the present invention when taken in conjunction with the accompanying figures, wherein.

DETAILED DESCRIPTION OF THE EXEMPLARY EMBODIMENTS

Figure 1:
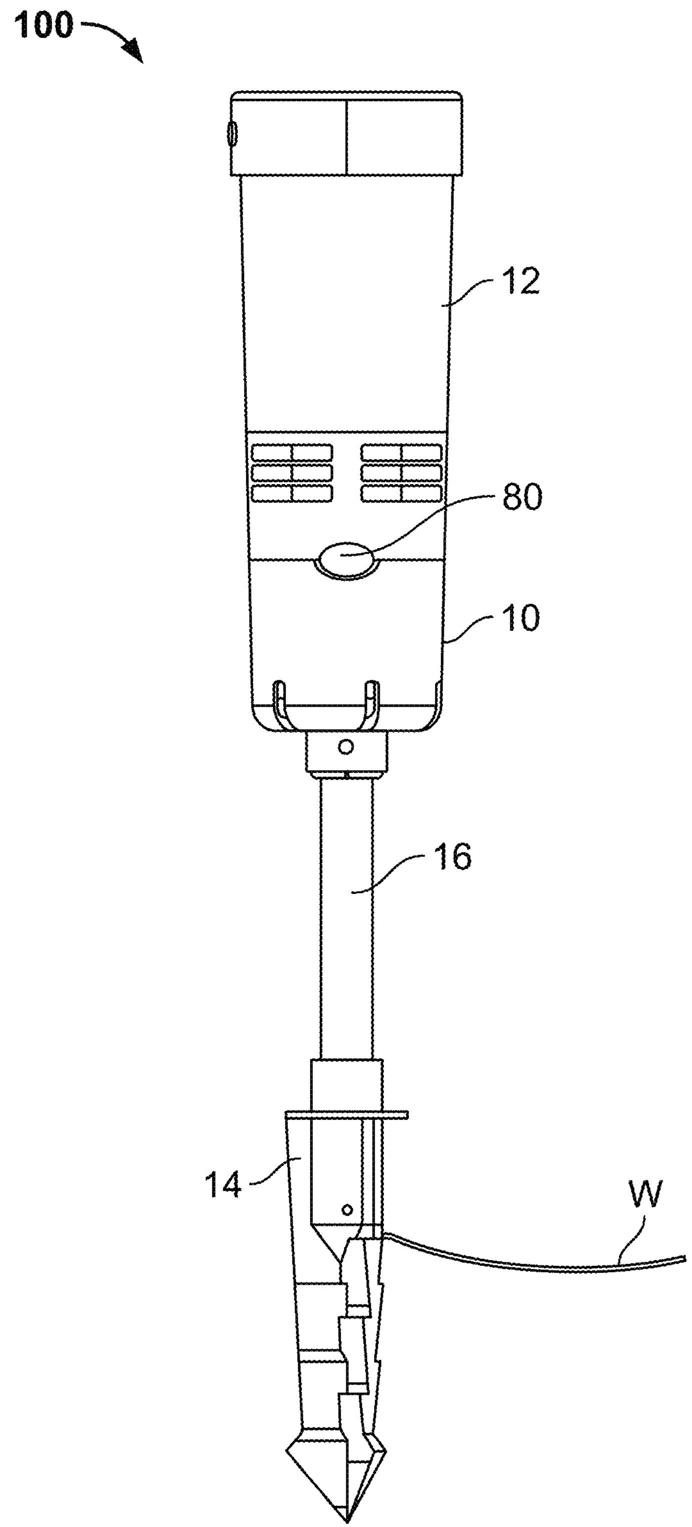
FIG. 1 illustrates a front view of an electric insect eliminator in accordance with an embodiment of the present disclosure.

An insect repellant device 100 in accordance with embodiments of the present disclosure is illustrated in the attached drawings. In embodiments, the insect repellant device 100 (see FIG. 1, for example) may include a repellant portion 10 and a light portion 12. In embodiments, the repellant portion 10 and the light portion 12 may be mounted on a stake 14 (see FIG. 1, for example) that may be configured for insertion into the ground. In embodiments, the stake 14 may be configured to be removably inserted into the ground to allow for repositioning of the device 100. In embodiments, the stake 14 may include a wire guide or channel that may be used to receive a wire W (see FIG. 1) to provide power to the device 100. In embodiments, a post 16 may extend upward from the stake 14 and the repellant portion 10 and light portion 12 may be mounted on top of the post 16. In embodiments, the post 16 may be of any desired length. In embodiments, the post 16 may include one or more segments connected together. In embodiments, the wire W may be received in the stake 14. In embodiments, a conduit or other channel may be provided to receive the wire W and pass it through the stake 14. In embodiments, the wire W may extend upward through a hollow central passage in the post 16 to provide power to the repellant portion 10 and the light portion 12. In embodiments, the wire W may provide a low voltage to the repellant portion 10 and the light portion 12, typically about 12V. In embodiments, the wire W may provide other voltages. In embodiments, the wire W may provide a voltage to a power source 68, discussed below, where the power source is connected to the repellant portion 10 and the light portion 12.

Figure 2:
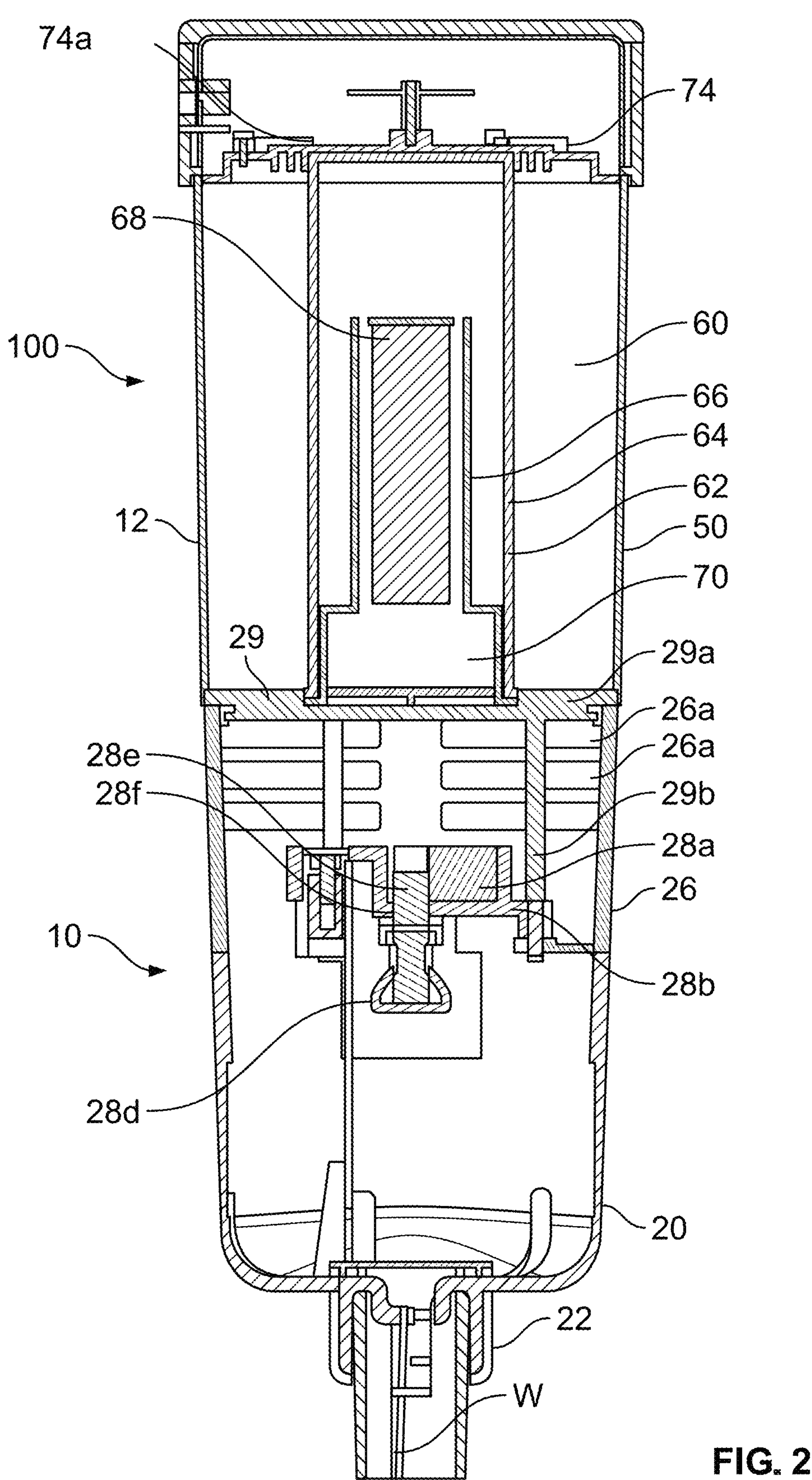
FIG. 2 illustrates a cross-sectional view of an insect repellant device with a simulated flame light source in accordance with an embodiment of the present disclosure.
Figure 2A:
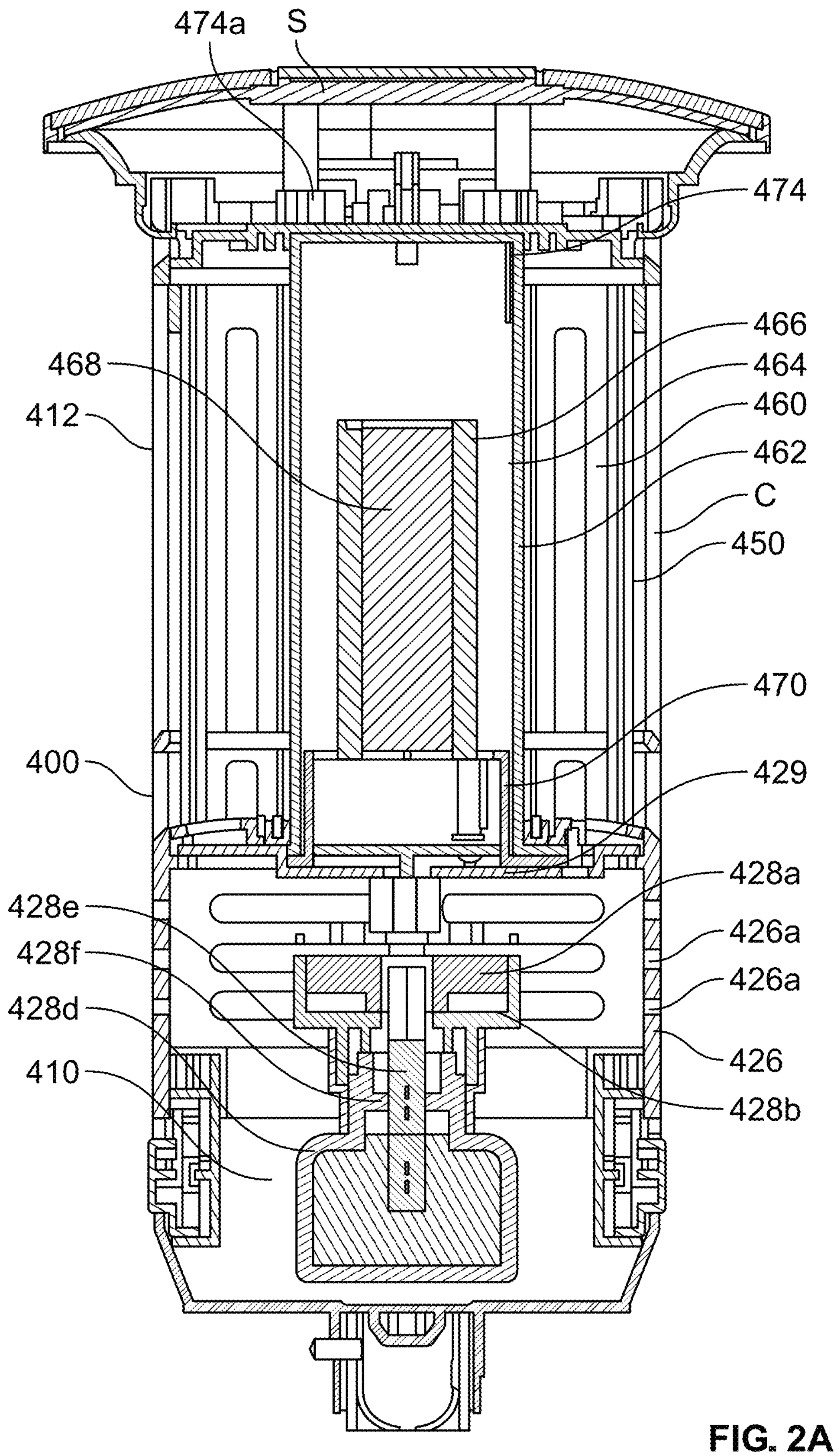
FIG. 2A illustrates a cross-sectional view of an insect repellant device with a simulated flame light source in accordance with another embodiment of the present disclosure.

In embodiments, an insect repellant device 400 has a generally rectangular shape, as shown in FIG. 2A. for example. The device 400, in embodiments, may include a repellant portion 410 and a light portion 412, generally similar to those discussed above. In embodiments, the repellant portion 410 and the light portion 412 may be mounted on a stake 414 (see FIG. 3A, for example) that may be configured for insertion into the ground. In embodiments, the stake 414 may be configured to be removably inserted into the ground to allow for repositioning of the device 400 as noted above with respect to device 100. In embodiments, a post 416 may extend upward from the stake 414 and the repellant portion 410 and light portion 412 may be mounted on top of the post 416. In embodiments, the post 416 may be of any desired length. In embodiments, the post 416 may include one or more segments connected together.

Figures 1A, 1B:
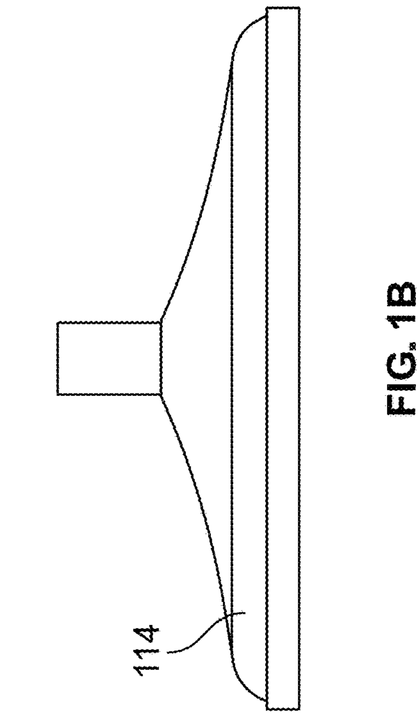
FIG. 1A illustrates a front perspective view of an electric insect eliminator in accordance with another embodiment of the present disclosure.
FIG. 1B illustrates a more detailed front view of a stand used in the electric insect eliminator of FIG. 1A.
Figure 1D:
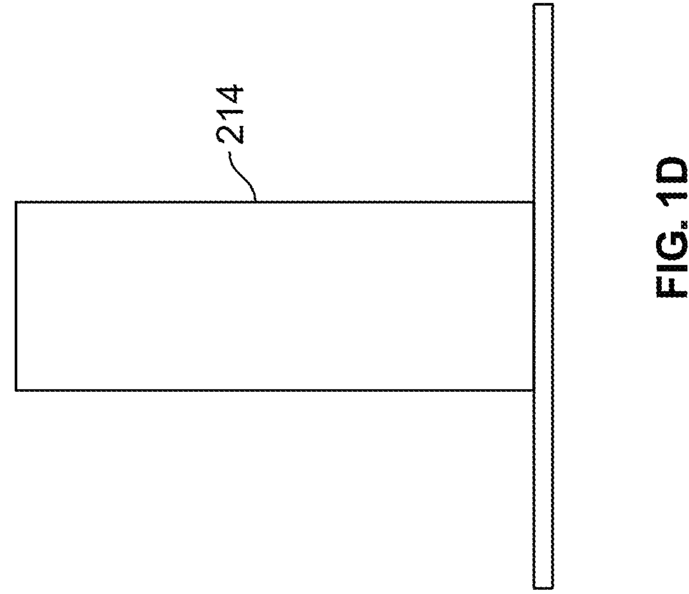
FIG. 1D illustrates a more detailed front view of a deck clip used in the electric insect eliminator of FIG. 1C.
Figure 1C:
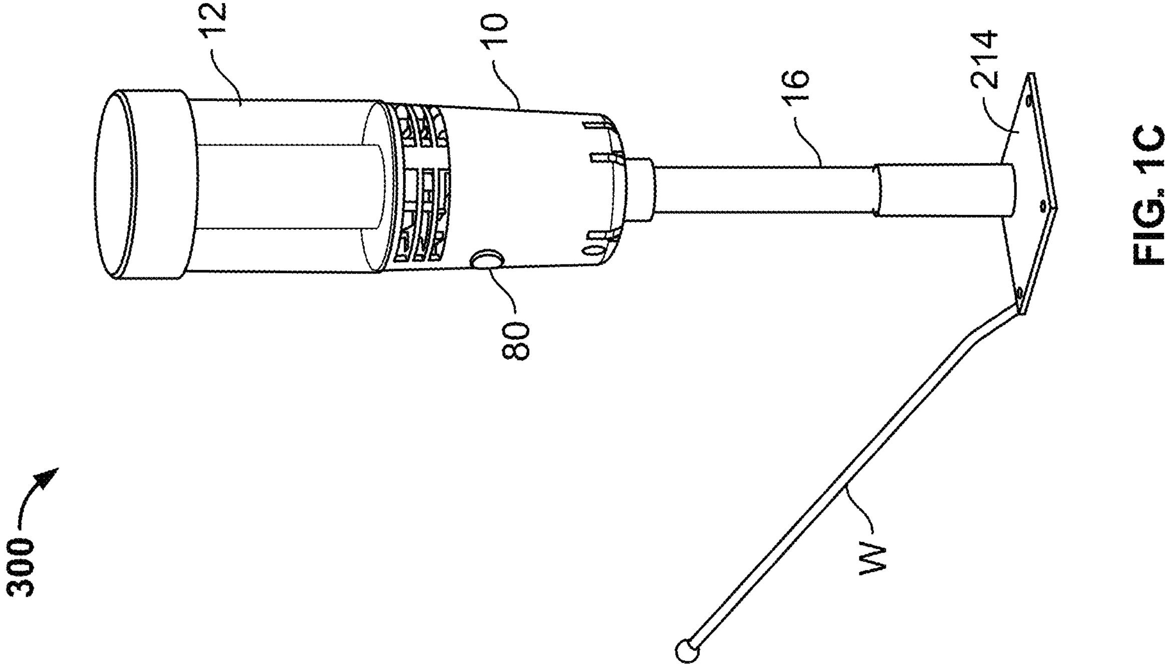
FIG. 1C illustrates a front perspective view of an electric insect eliminator in accordance with another embodiment of the present disclosure.

In embodiments, the stake 14 may not be used and the repellant portion 10 and the light portion 12 may be mounted on a stand 114 (see FIGS. 1A and 1B, for example) or in a base that may be positioned as desired on virtually any surface. In embodiments, where a repellant device 200 uses a stand 114 (see FIGS. 1A and 1B, for example), the repellant portion 10 and the light portion 12 may be mounted in or on the stand. In embodiments, the wire W may pass through the stand 114 as generally indicated in FIG. 1B and the stand may replace the stake 14. In embodiments, the repellant portion 10 and the light portion 12 may be mounted in or on a deck clip 214 (see FIGS. 1C and 1D, for example). In embodiments, where the repellant device 300 uses a deck clip 214, the wire W may pass through the desk clip 214 as generally indicated in FIG. 1C and the desk clip may replace the stake 14.

Figure 3:
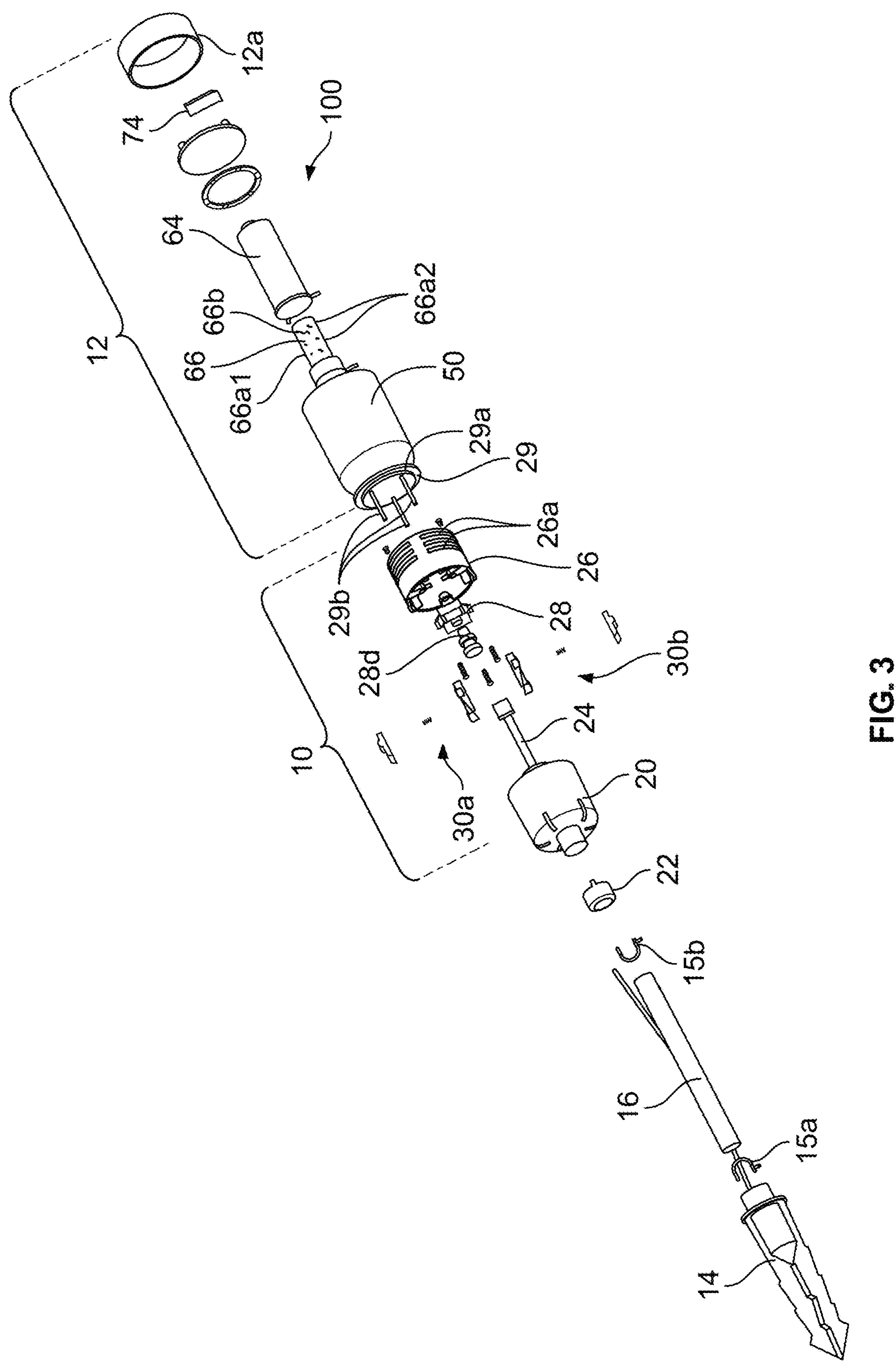
FIG. 3 illustrates an exploded view of the electric insect eliminator of FIGS. 1-2 in accordance with an embodiment of the present disclosure.
Figure 3A:
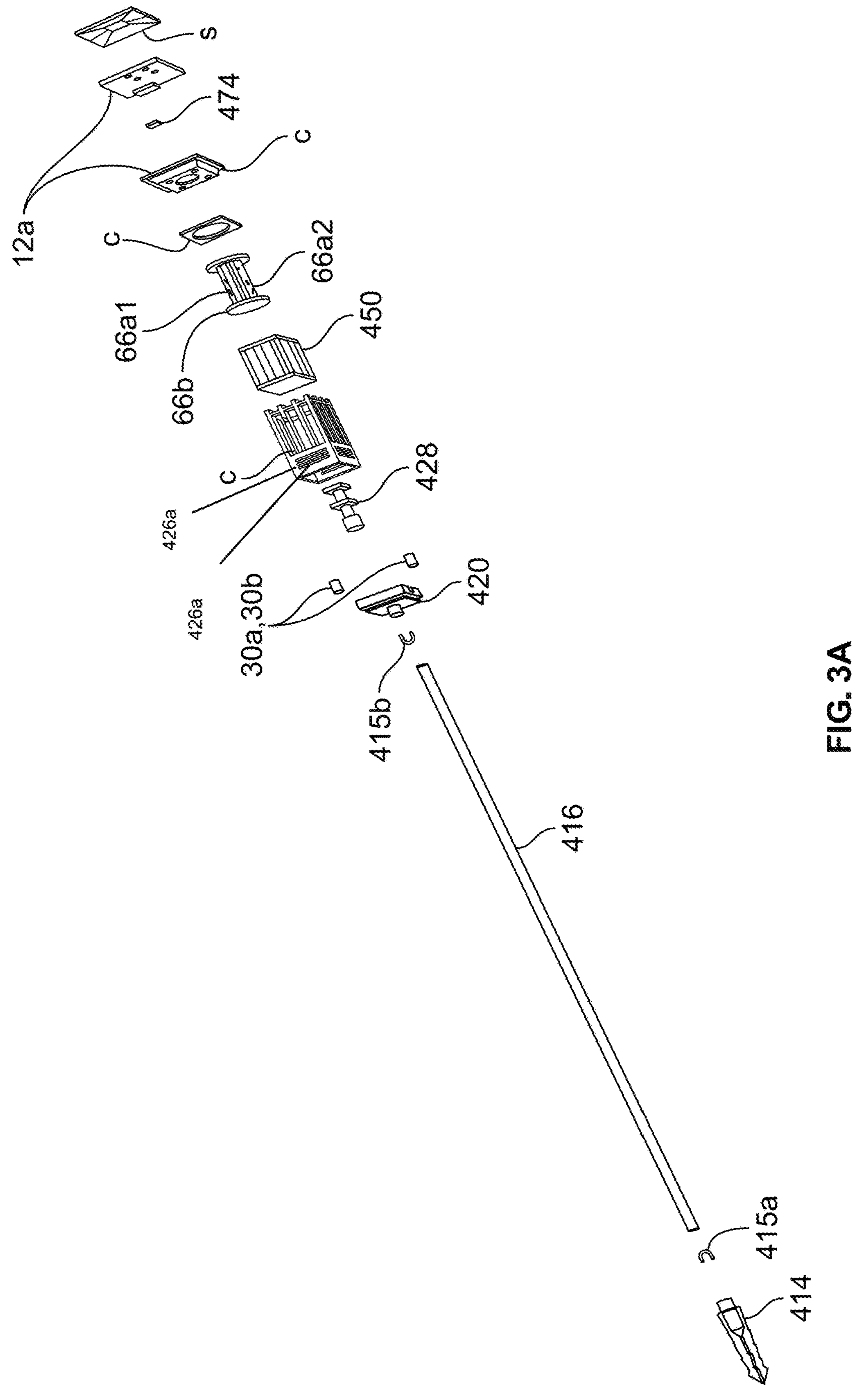
FIG. 3A illustrates an exploded view of the electric insect eliminator of FIG. 2A in accordance with an embodiment of the present disclosure.
Figure 4:
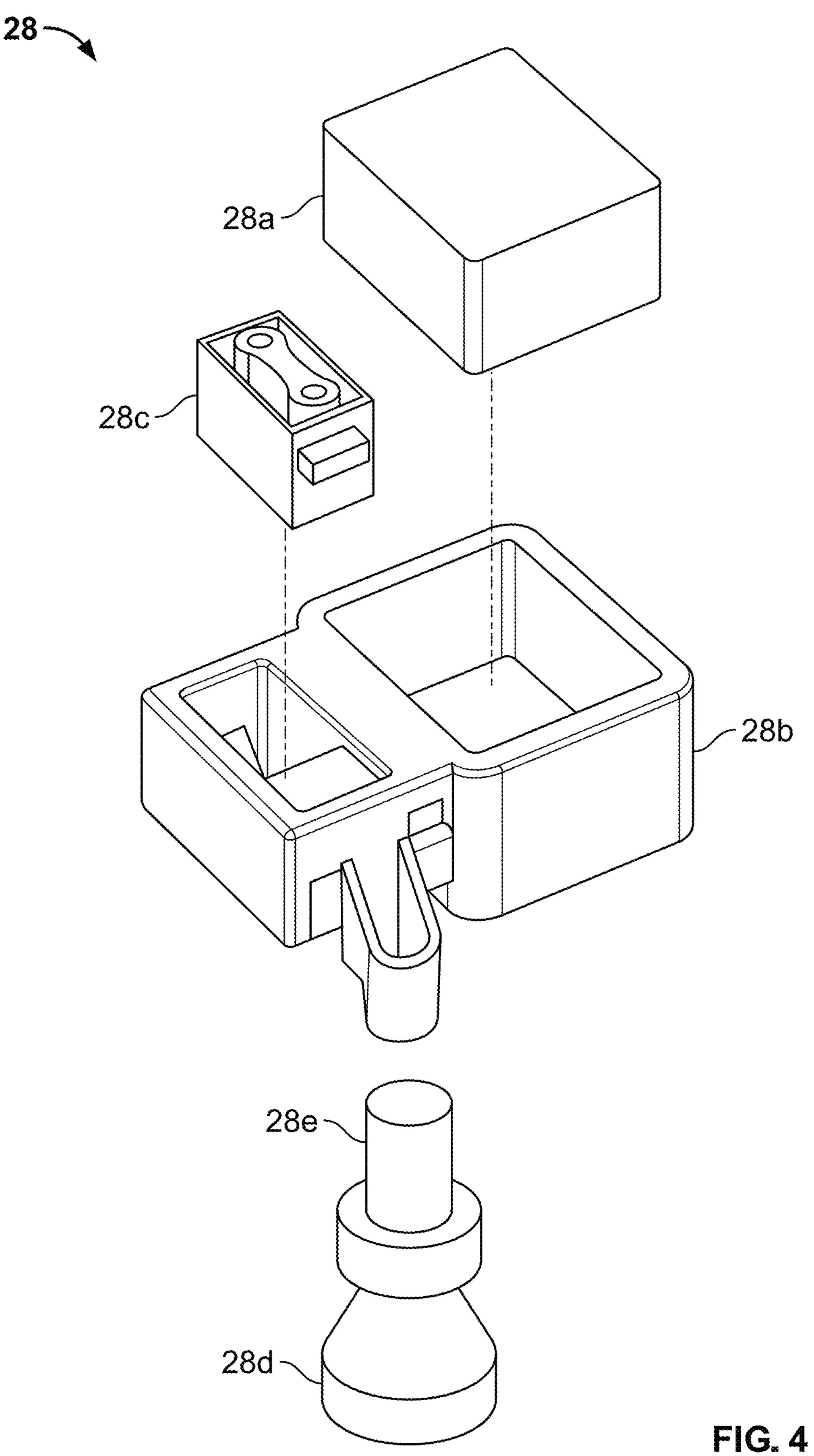
FIG. 4 illustrates a more detailed view of a heating assembly used in the insect repellant device of FIGS. 1-3 in accordance with an embodiment of the present disclosure.
Figure 5:
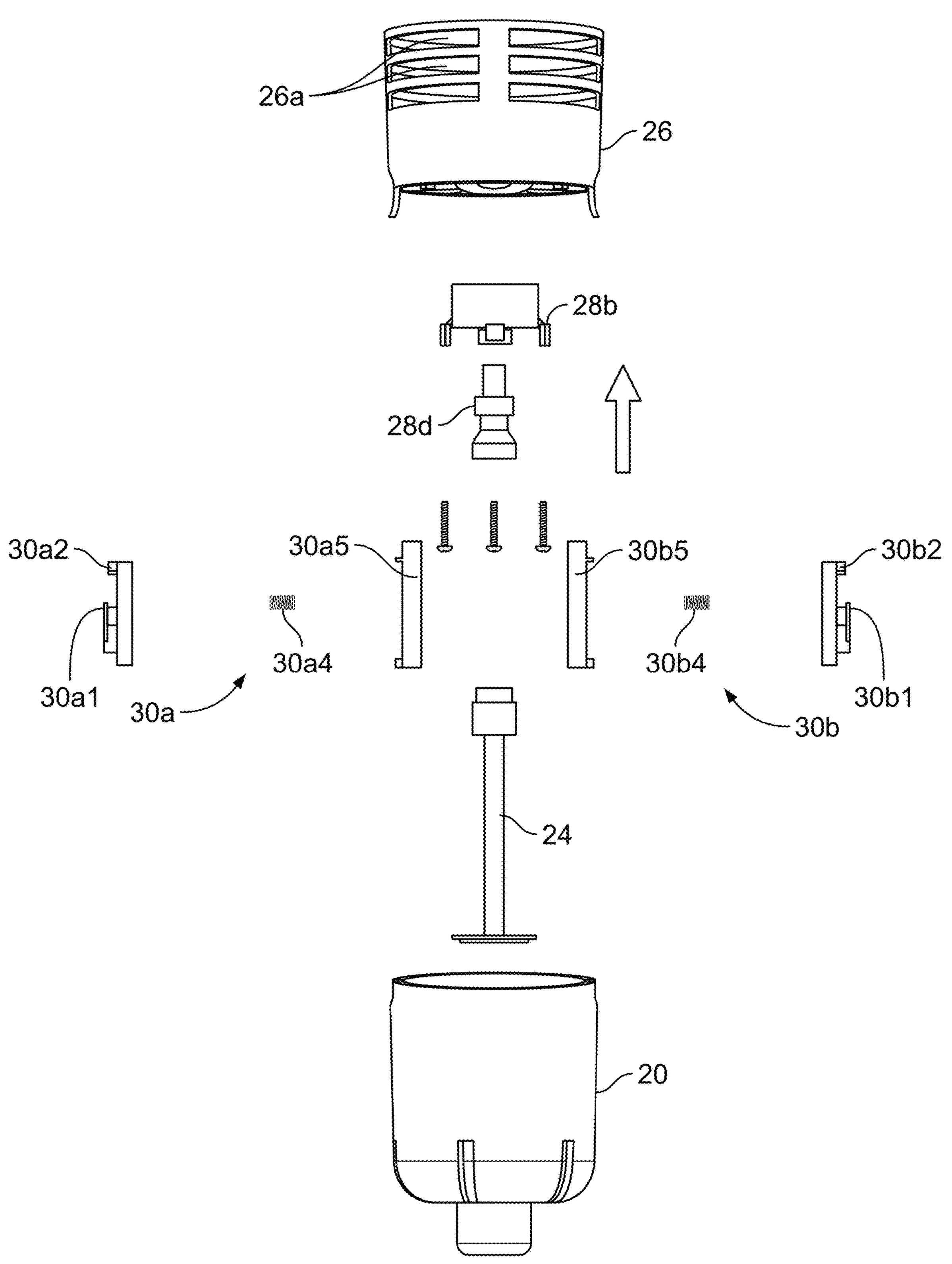
FIG. 5 illustrates a more detailed view of the repellant portion of the insect repellant device of FIGS. 1-3 in accordance with an embodiment of the present disclosure.

In embodiments, the stake 14, 414 may be connected to the post 16, 416 via a first spring lock 15*a*, 415*a* to allow for releasably securing the stake to the post. In embodiments, the post 16, 416 may be attached to a base 20, 420 of the repellant portion 10 via a second spring lock 15*b*, 415*b*. While FIGS. 3, 3A illustrate the spring locks 15*a*, 415*a*, 15*b*, 215*b* or other securing devices may be used to connect the stake 14, 414 to the post 16, 416 and the post to the base 20, 420 including but not limited to threads, screws, or a frictional connection, to name a few.

In embodiments, a cover 22 may be provided around the spring lock 15*b* connecting the post 16 and the base 20. In embodiments, another cover may be provided around the spring lock 15*a*, if desired. In embodiments, the cover 22 may not be provided. In embodiments, the device 400 may include a cover.

In embodiments, a wire guide 24 may be mounted in the base 20, which is mounted on top of the post 16, and the wire W may extend through the wire guide 24. In embodiments, the wire guide 24 may be made of plastic or any electrically nonconducting material. In embodiments, a repellant housing 26 may be mounted on top of the base 20. In embodiments, the repellant housing 26 may include a plurality of vent openings 26*a* formed in a sidewall thereof. In embodiments, the vent openings 26*a* are sized to allow vaporized insect repellent material to exit the repellant housing 26 while preventing users from reaching inside the housing 26. In embodiments, the vent openings 26*a* may be 0.13 inches apart, however, this distance may be larger or smaller. In embodiments, the device 400 may not include the wire W or a wire guide.

In embodiments, a heating assembly 28, 428 may be mounted in the repellant housing 26, 426. In embodiments, the heating assembly 28, 428 may include a heating element 28*a*, 428*a* mounted in a heating housing 28*b*, 428*b* of the heating assembly. In embodiments, the heating element 28*a*, 428*a* may be a ceramic heating element. In embodiments, ceramic heating elements offer certain benefits including quick heating, a high heat to size ratio and high energy efficiency. In embodiments, any suitable heating element may be used including an etched foil heater, a band heater or a tubular heater, to name a few. In embodiments, a power terminal 28*c* may be provided in the heating housing 28*b* and may be electrically connected to the heating element 28*a*. In embodiments, the power terminal 28*c* may be electrically connected to the heating element 28*a* such that the heating element 28*a* generates heat. In embodiments, the power terminal 28*c* may be electrically connected to the wire W and provides power to the heating element 28*a*. In embodiments, power terminal 428*c* may be, or may be connected to a power source 68, 468 where wire W is not used, as shown in FIGS. 2A and 3A, for example. In embodiments, a repellant cartridge 28*d*, 428*d* may be mounted in the heating housing 28*b*, 428*b*. In embodiments, the repellant cartridge 28*d*, 428*d* may hold insect repellent. In embodiments, a wick 28*e*, 428*e* may extend from a top of the cartridge 28*d*, 428*d* and may be positioned adjacent to the heating element 28*a*, 428*a* when the repellant cartridge is mounted in the housing 28*b*, 428*b*. In embodiments, the repellant cartridge 28*d*, 428*d* may be removably mounted in the housing 28*b*, 428*b*. In embodiments, the cartridge 28*d*, 428*b* may be screwed into the housing 28*b*, 428*b*. In embodiments, the housing 28*b*, 428*b* may include an opening 28*f*, 428*f* configured to receive at least a top portion of the cartridge 28*d*, 428*d* such that the wick 28*e*, 428*e* is positioned adjacent to the heating element 28*a*, 428*a* when the top portion of the cartridge 28*d* 428*d* is positioned in the opening 28*f*, 428*f* as can be seen in FIGS. 2 and 2A for example. In embodiments, the cartridge 28*d*, 428*d* may be secured to the housing 28*b*, 428*b* is any desired manner. In embodiments, the insect repellent may be metofluthrin, however any suitable insect repellant may be used including transfluthrin or essential oils, to name a few. In embodiments, the wick 28*e*, 428*e* may draw repellant up out of the top of the cartridge 28, 428 adjacent to the heating element 28*a*, 428*a* where heat from the heating element 28*a* vaporizes the repellant. The vaporized repellant may flow out through the openings 26*a*, 426*a* into the area around the repellant device 100, 400 to create an insect free area around the device.

In embodiments, a heating assembly top 29, 429 may be provided above the heating assembly 28, 428. In embodiments, the heating assembly top 29, 429 may include a top disk 29*a* with a plurality of legs 29*b* extending downward therefrom spacing the disk 29*a* from the housing 28*b* to provide a space for vaporized repellant to fill prior to exiting through the openings 26*a*, 426*a*.

Figure 6:
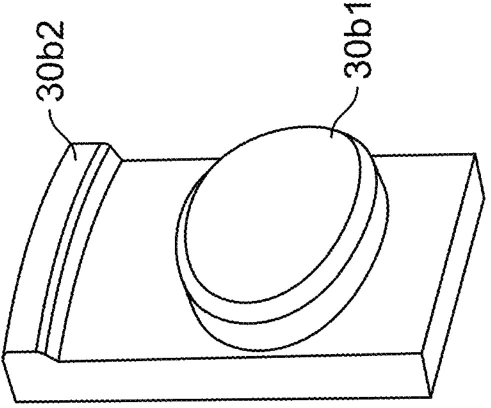
FIG. 6 illustrates a more detailed view of a release button for a repellant cartridge used in the insect repellant device of FIGS. 1-3 in accordance with an embodiment of the present disclosure.
Figure 6:
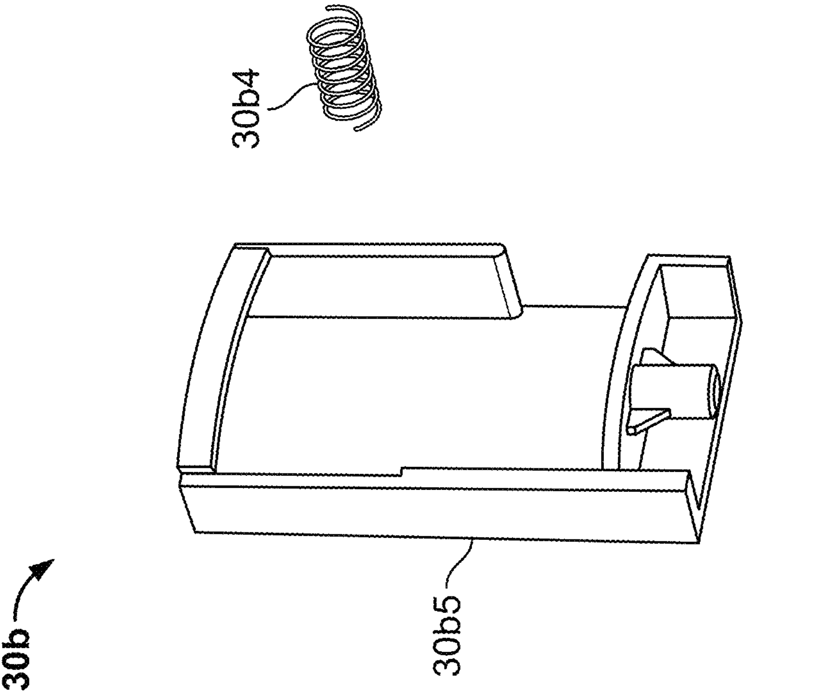
Figure 7:
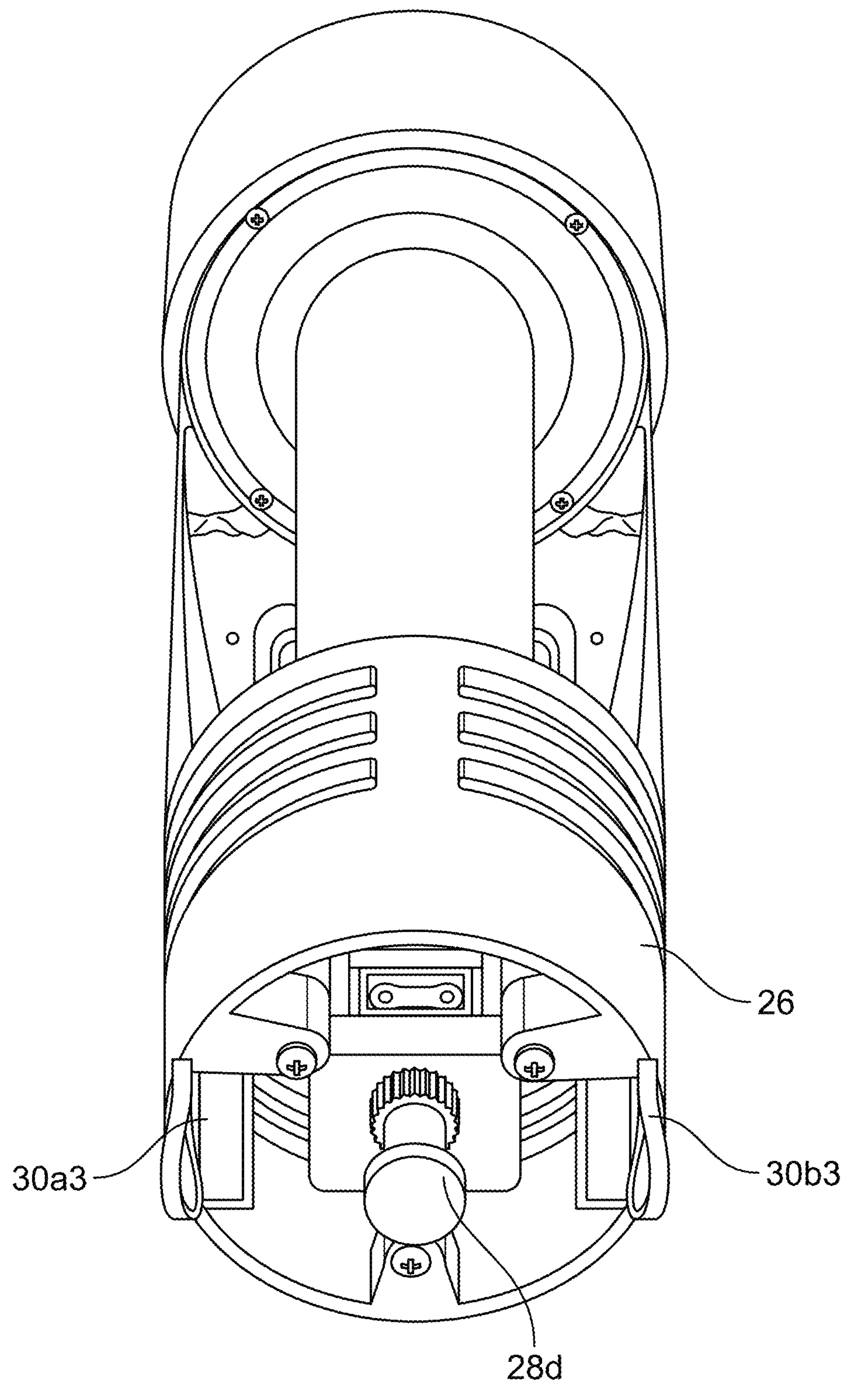
FIG. 7 illustrates a view of a light portion of the insect repellant device of FIGS. 1-3 separated from the light portion in accordance with an embodiment of the present disclosure.
Figure 7A:
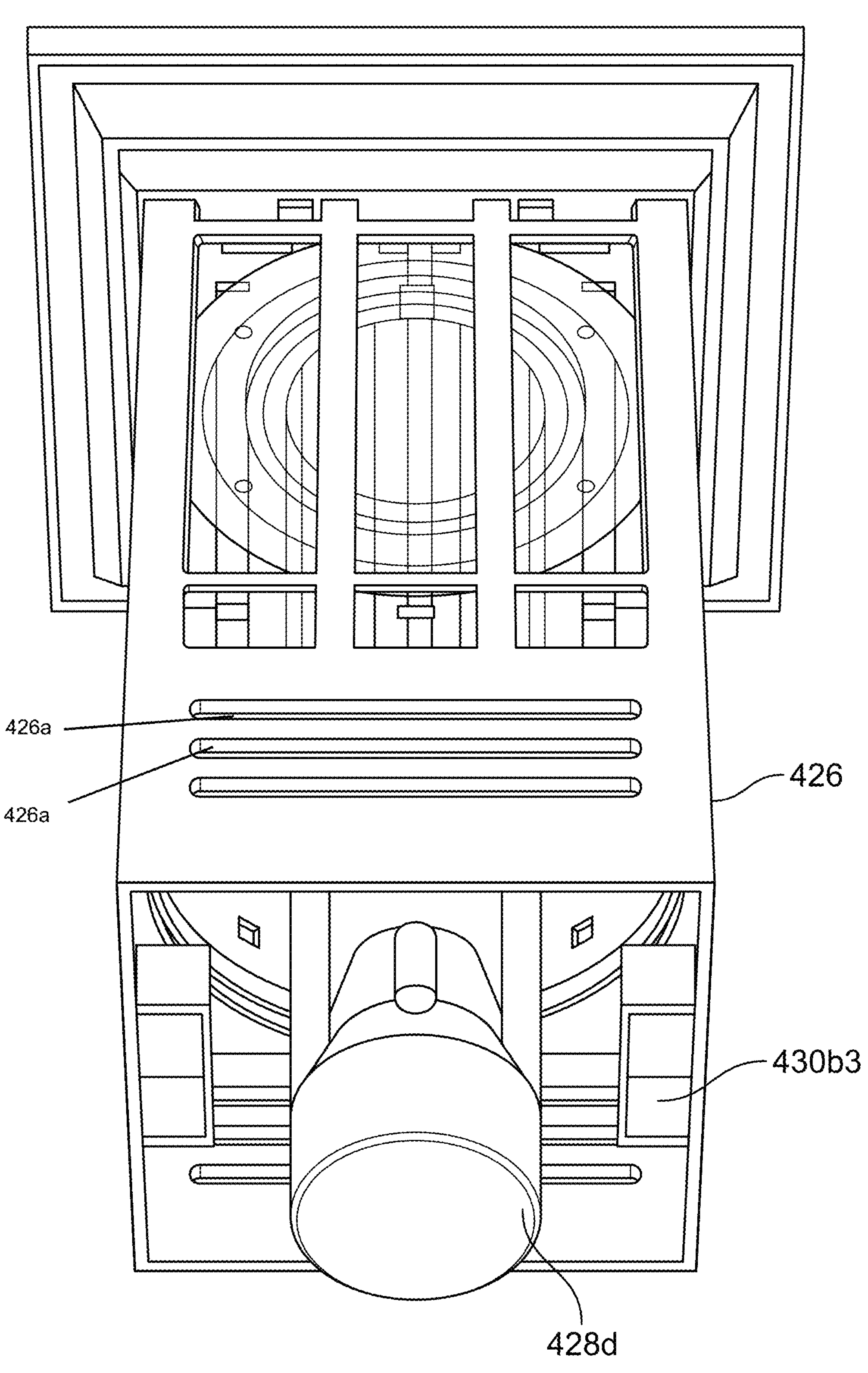
FIG. 7A illustrates a view of a light portion of the insect repellant device of FIGS. 2A and 3A separated from the light portion in accordance with an embodiment of the present disclosure.
Figure 8:
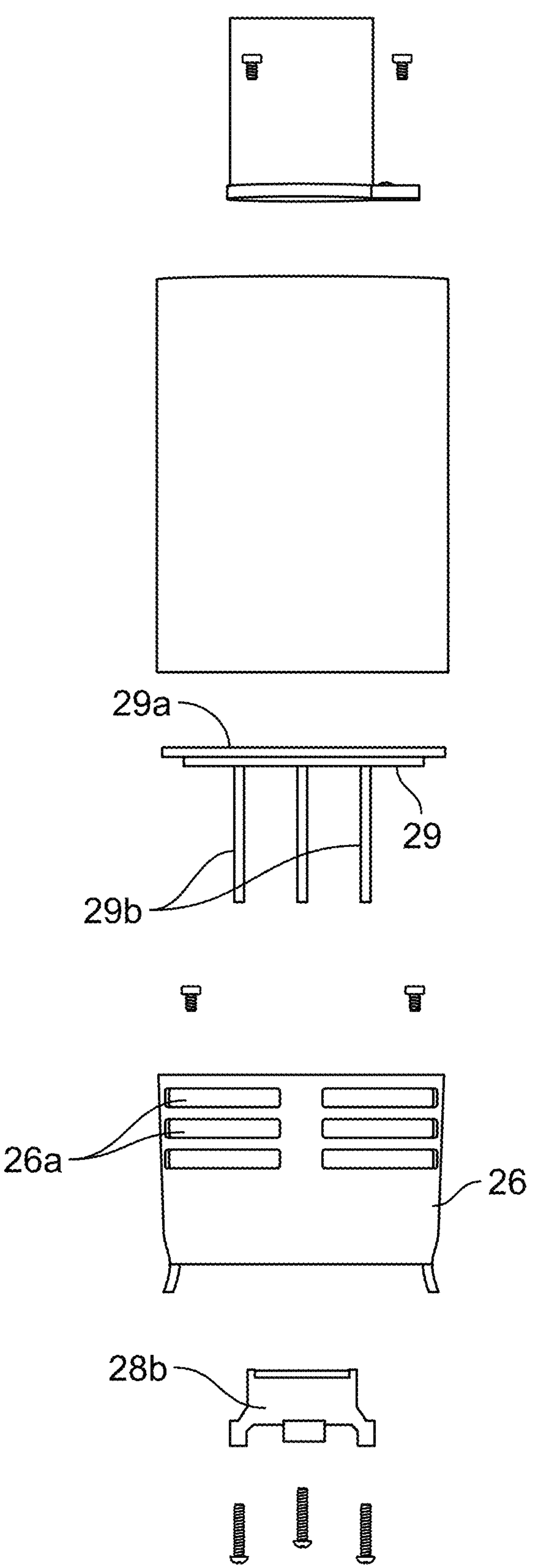
FIG. 8 illustrates a more detailed view of the repellant portion used in the insect repellant device of FIGS. 1-3 in accordance with an embodiment of the present disclosure.

In embodiments, the repellant housing 26 may be separated from the base 20 to allow access to the cartridge **28*d* as illustrated in FIGS. 7 and 7A, for example. In embodiments, the housing 26 may be separated from the base 20, 420 such that the cartridge 28*d* can be removed and replaced in the heating element housing 28*b*. In embodiments, a pair of release elements 30*a*, 30*b* may be provided in the base 20, 420 to releasably connect the base to the housing 26, 426. In embodiments, each of the release elements 30*a*, 30*b* may include a button 30*a*1, 30*b*1 mounted in a respective casing 30*a*5, 30*b*5 (see FIGS. 6, for example) in the base 20, 420 that may be pushed inward to move a corresponding protrusion 30*a*2, 30*b*2 inward. The protrusions 30*a*2, 30*b*2 may be received in respective slots 30*a*3, 30*b*3 formed in the housing 26 to secure the base 20 to the housing 26 when the protrusions 30*a*2, 30*b*2 are in the slots 30*a*3, 30*b*3 and release the base from the housing when the protrusions are pushed inward. In embodiments, a respective biasing spring 30*a*4, 30*b*4 biases the buttons 30*a*1, 30*b*1 and protrusions 30*a*2, 30*b*2 outward and into the slots 30*a*3, 30*b*3 to hold the housing 26 on the base 20. When a user pushes the buttons 30*a*1, 30*b*1 inward, the protrusions 30*a*2 and 30*b*2 are removed from the slots 30*a*3, 30*b*3 to allow the housing 26 to be removed from the base 20, 420. Once removed, the cartridge 28*d* may be removed from the repellant housing 28*b*** and replaced with a new cartridge, if desired.

Figure 6A:
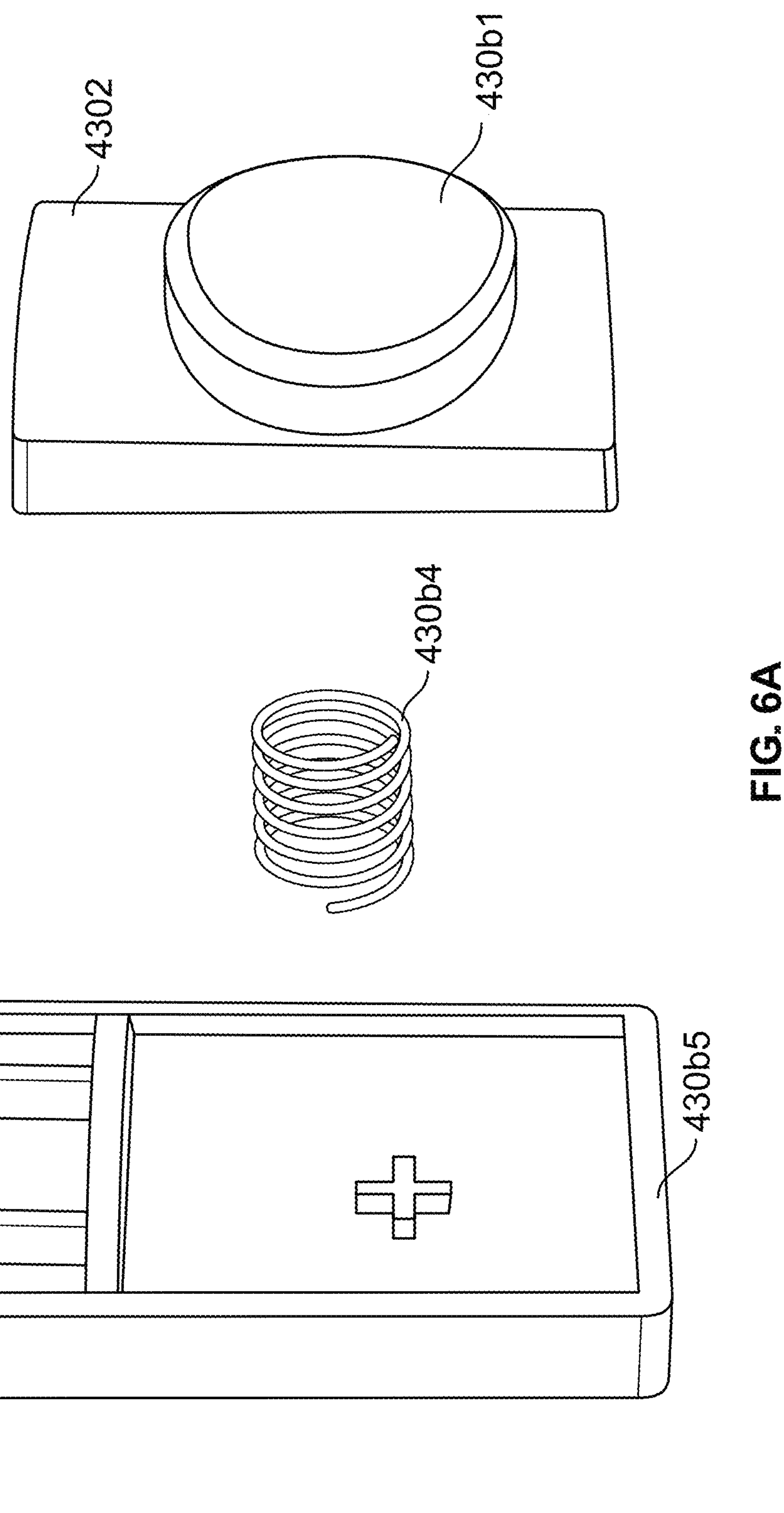
FIG. 6A illustrates a more detailed view of a release button for a repellant cartridge used in the insect repellant device of FIGS. 2A and 3A in accordance with an embodiment of the present disclosure.

In embodiments, a pair of release elements **430*a*, 430*b* may be provided in the base 420 in device 400 to releasably connect the base to the housing 426. In embodiments, each of the release elements 430*a*, 430*b* may include a button 430*a*1, 430*b*1 mounted in a respective casing 430*a*5, 430*b*5 (see FIG. 6A, for example) in the base 420 that may be pushed inward to move a corresponding protrusion 430*a*2, 430*b*2 inward. The protrusions 430*a*2, 430*b*2 may be received in respective slots 430*a*3, 430*b*3 formed in the housing 426 to secure the base 420 to the housing 426 when the protrusions 430*a*2, 430*b*2 are in the slots 430*a*3, 430*b*3 and release the base from the housing when the protrusions are pushed inward. In embodiments, a respective biasing spring 430*a*4, 430*b*4 biases the buttons 430*a*1, 430*b*1 and protrusions 430*a*2, 430*b*2 outward and into the slots 430*a*3, 430*b*3 to hold the housing 426 on the base 420. When a user pushes the buttons 430*a*1, 430*b*1 inward, the protrusions 430*a*2 and 430*b*2 are removed from the slots 430*a*3, 430*b*3 to allow the housing 426 to be removed from the base 420. Once removed, the cartridge 428*d* may be removed from the repellant housing 428*b*** and replaced with a new cartridge, if desired.

In embodiments, the light portion 12 may be mounted on top of the repellant portion 10. In embodiments, a screen element 50, may be mounted on top of the housing 26 and extend around a periphery of the light portion 12. In embodiments, the screen element 50 may be substantially transparent. In embodiments, the screen element 50 may be substantially waterproof, or water resistance and may be used to protect the light emitting assembly 60 provided inside the screen element 50.

In embodiments, a screen 450 may be mounted on top of the housing 426 and extend around a periphery of the light portion 12. In embodiments, the screen 450 may protect the light emitting assembly 460 provided inside the cage 450. In embodiments, the screen 450 may include openings that allow for repellant to exit the device 400. In embodiments, an outer cage C is mounted outside of the screen 450.

In embodiments, the light emitting assembly 60, 460 may include a cylindrical shade 62, 462 surrounding a light emitting element 64, 464. In embodiments, the light emitting element 64, 464 may include a plurality of light sources 66A1, 66A2 (see FIGS. 3 and 3A) which may be mounted on a flexible printed circuit board 66. In embodiments, the board 66, 466 may be mounted on a support 70, 470. In embodiments, the light sources are LEDs 66A1, 66A2 that emit light through the shade 62, 462 which may be tinted or colored to provide the impression of a flame. In embodiments, one or more of the LEDs 66A1, 66A2 may be a different color in order to provide the impression of a flame. In embodiments, the LEDs 66A1 belong to a first group and the LEDs 66A2 belong to a second group. In embodiments, the first group of the LEDs 66A1 may be driven to blink on and off together. In embodiments, the second group of LEDs 66A2 may be driven to brighten and dim in intensity together. In embodiments, the second group of LEDs 66A2 may be positioned below the first group of LEDs 66A1 or vice versa. In embodiments, one or more of the light emitting diodes in the first group of LEDs 66A1 or the second group 66A2 may be of different colors. The combination of the two groups of LEDs, when viewed through the shade 62, 462 which may be tinted or colored as noted above, if desired, provides the impression of a flickering flame behind the screen 50, 450. In embodiments, the shade 62, 462 may be of any desired shape provided that it fits within the screen 50, 450. In embodiments, while LEDs are preferred, other light sources may be used.

In embodiments, the light emitting assembly 60, 460 may also provide constant, that is, non-flickering light. In embodiments, the circuit board 66, 466 may include additional constant light sources 66B that may be used to provide a constant light rather than the flickering effect discussed above. In embodiments, the light sources 66B may be of the same color and evenly spaced around the substrate 62, 462. In embodiments, the light sources 66B may be activated together and remain on at the same time to provide for a constant light that does not flicker. In embodiments, the light sources 66B may be white light LEDs. In embodiments, when the light sources 66B are activated, the light sources 66A1, 66A2 are not activated such that the light portion 60 may operate in a constant light mode or a flickering mode. In embodiments, the LEDs 66A1, 66A2 may be used to provide constant light by simply being operated in an alternate state in which they do not blink on and off or dim. In embodiments, where the LEDs 66A1, 66A2 may be used to provide constant light, it may not be necessary to provide the light sources 66B. In embodiments, the flexible circuit board 66, 466 may include additional constant light sources, for example, white light LEDs that may be operated to provide constant light, without flickering, if desired. In embodiments, one or more of the LEDs in the first group of LEDs 66A1 and/or the second group of LEDs 66A2 may be operated in a constant manner to provide constant light without flickering.

In embodiments, a circuit board 74, 474 (see FIGS. 2, 2A, 3, 3A for example) may be provided to hold or provide control circuitry, or control circuit **74*a*, 474*a* for the light emitting assembly portion 60, 460 and the repellant portion 10. In embodiments, a power source 68, 468 which may be a battery, may be operatively connected to the PCB 74, 474 and used to power the repellant portion 10 and the light portion 12. In embodiments, except for that of FIG. 2A, 3A, 6A or 7A, an external transformer may be used to provide power via the wire W, which may be operatively connected to the power source 68. In embodiments, the power source 68, 468 may be provided on the circuit board 74, 474. In embodiments, the control circuit 74*a*, 474*a* may be provided elsewhere and need not be mounted on the circuit board 74, 474. In embodiments, the power source 68, 468 may be mounted on the base 70, 470 as indicated in FIGS. 2 and 2A, for example. In embodiments, the power source 68, 468 may be a rechargeable battery. In embodiments, the power source 68, 468 may be recharged via a line voltage, if desired via a USB, wireless or other connection. In embodiments, the battery may be recharged via any other suitable power source. The power source 68, 468 may be any suitable power source. In embodiments, the power source 68, 468 may be a transformer or transformers that may be used to provide one or more desired voltages to the light portion 12 and repellant portion 10 from the voltage provided via the wire W. In embodiments, the power source 468 may be recharged via a solar panel S, which may be mounted on the top of the device, 400. In embodiments, the power source 68 may be operatively connected to the power terminal 28***c* to provide power and/or for connection to the wire W. In embodiments, the power source 68 may be a transformer connected to the wire W to convert the voltage provided by the wire W to a desired voltage suitable for use with the repellant portion 10 and the light portion 12. In embodiments, the power source 68 may be a terminal or contact connected to the wire W.

In embodiments, the control circuit 74*a*, 474*a* may include an LED boost circuit used to drive the LEDs 66A1, 66A2 and/or LEDs 66B as well. In embodiments, other driving circuitry may be provided to drive the LEDs 66A1, 66A2 and 66B. As noted above, the two groups of LEDs 66A1, 66A2 are preferably driven in a particular sequence to simulate a flame while the LEDs 66B may be driven to provide constant light. In embodiments, the control circuit 74*a* may include circuitry to control the repellant portion 10, and specifically the activation of the heating element 28*a*.

In embodiments, the base 70, 470 of the light element 60, 460 may be mounted on or connected to the heating assembly top 29, 429 and specifically the disk portion 29*a*, thereof. In embodiments, the circuit board 74, 474 may be mounted in or under a top element 12*a* of the light portion 12. In embodiments, the top element 12*a* may be mounted in top of the screen 50, 450.

In embodiments, an input device 80 (see FIG. 1) such as a power button or switch may be operable to activate the light portion 12 and/or the repellant portion 10. That is, in embodiments, the light portion 12 may be activated without activating the repellant portion 10. In embodiments, the input device 80 may activate the repellant portion 10 and not the light portion 12. In embodiments, the repellant portion 10 and the light portion 60 may be activated at the same time. In embodiments, the light portion 12 may be activated without the repellant portion 10. In embodiments, the additional LEDs 66B or other light sources may be used to provide for a constant light rather than flickering and may also be controlled by input from the input device 80. In embodiments, these constant light sources 66B may be activated with or without activation of the repellant portion 10. In embodiments, other input devices, other than a power button, may be used to provide input to control the repellant portion 10 and the light portion 12 including the flickering LEDs 66A1, 66A2 and the constant light sources 66B. In embodiments, a light sensor may provide information regarding ambient light levels around the repellant device 100, 200, 300, 400. In embodiments, the light sensor may be provided on or integrated with a transformer, which may be provided externally or in the base 20, 420 as desired. In embodiments, the repellant device 100, 200, 300, 400 may be activated when the ambient light level drops below a threshold level and may turn off when the light level rises above the threshold. In embodiments, the repellant device 100, 200, 300, 400 may be activated such that the light portion 12 is activated to provide either the simulated flame light or the constant light when the ambient light level drops below the threshold level. In embodiments, the repellant portion 10 may be activated to vaporize repellant with or without the flickering LEDs 66A1, 66A2 or the constant light sources 66B activated based on the ambient light level. In embodiments, the light sensor may be a photocell, however, any suitable light sensor device may be used. In embodiments, the light sensor may be provided at any desired portion on the repellant device 100, 200, 300 and 400 or as part of a control system operatively connected to the device. In embodiments, the device 400 may also include the input device 80.

Figure 9:
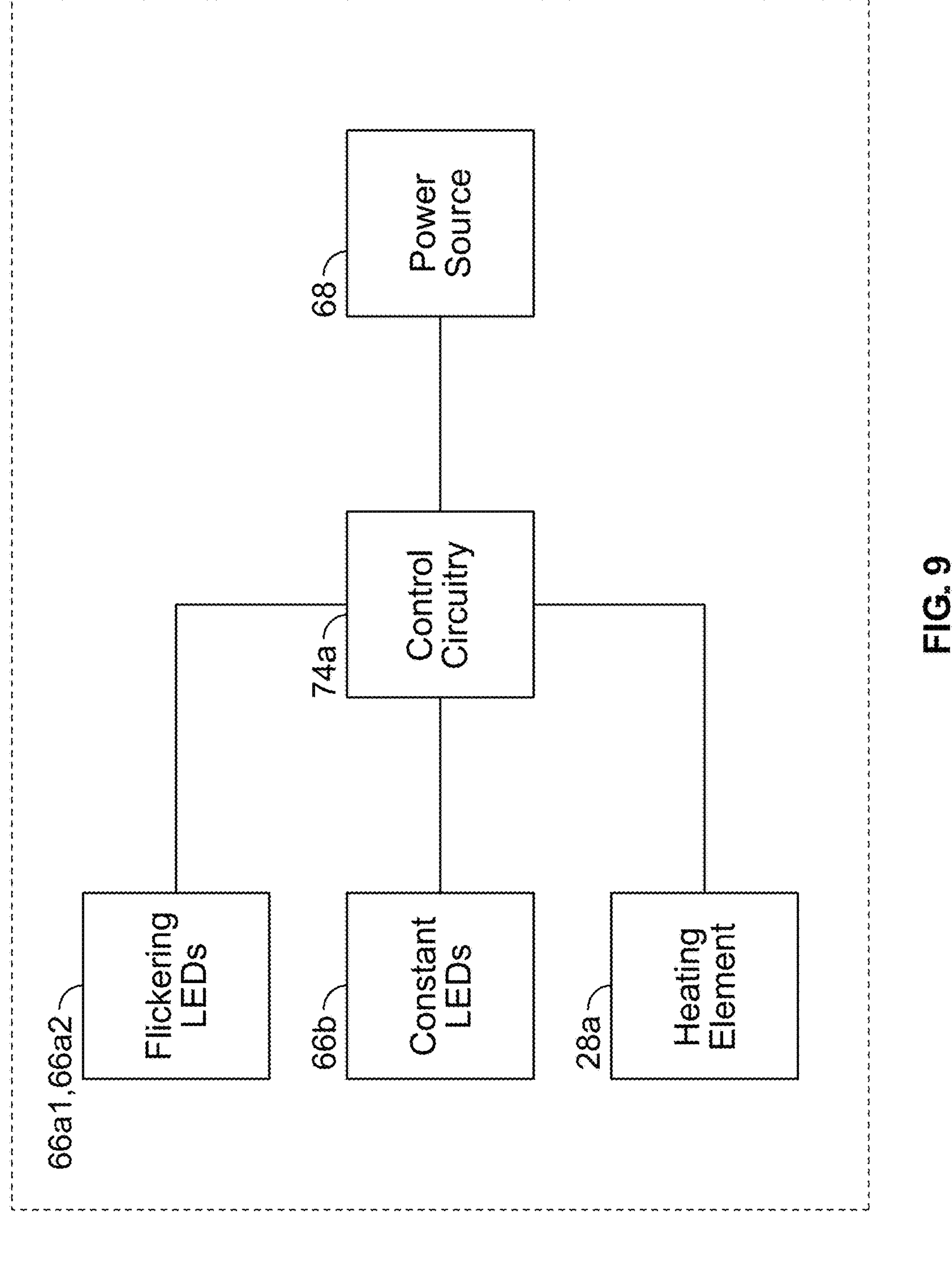
FIG. 9 illustrates an exemplary block diagram of the insect repellant device of FIGS. 1-3 in accordance with an embodiment of the present disclosure.

FIG. 9 illustrates an exemplary block diagram of the repellant device 100, 200, 300, 400. In embodiments, the power source 68, 468 may provide power to the heating element 28*a*, 428*a*, the flickering LEDs 66A1, 66A2 and LEDs 66B as well as the control circuit 74*a*, 474*a*. The control circuitry, or control circuit, 74*a*, which may be provided on a printed circuit board and may be or include a boost circuit, and/or other circuitry, may drive the flickering LEDs 66A1, 66A2 and LEDs 66B. The control circuitry 74*a* 474*a* may also control activation of the repellant portion 10, specifically activation of the heating element 28*a*, 428*a* to vaporize insect repellant. As noted above, the flickering LEDs 66A1, 66A2 may be driven in respective patterns to simulate the appearance of a flickering flame and the LEDs 66B may be activated to provide constant light when desired. In embodiments, the control circuitry 74*a* 474*a* may be connected to the input device 80 such as a power button and may drive the repellant portion 10, the flickering LEDs 66A1, 66A2 or constant light LEDs 66B based on input provided by the input device 80. In embodiments, separate control circuitry may be provided and connected to the input device 80 to control the repellant portion 10, the flickering LEDs 66A1, 66A2 and LEDs 66B. In embodiments, the light level information provided by the light sensor may be provided to the control circuitry 74*a*. In embodiments, the control circuitry 74*a* may include a processor, microprocessor or other control element or component to provide for control of the repellant portion 10, the flickering LEDs 66A1, 66A2 and LEDs 66B. In embodiments, control of the repellant portion 10, the flickering LEDs 66A1, 66A2 and LEDs 66B may be based on both input from the power button 80 and the light sensor. In embodiments, the input device 80 may be pressed once, or placed in a first position, to enter a light monitoring mode in which power is provided to one or more of the repellant portion 10, the flickering LEDs 66A1, 66A2 and LEDs 66B when the light information indicates a light level below a threshold based on input form the sensor. In embodiments, one or more of the repellant portion 10, the flickering LEDs 66A1, 66A2 and LEDs 66B may be deactivated when the light level rises above the threshold. In embodiments, pushing the button 80 again, or putting it in a second position, may directly activate one or more of the repellant portion 10, the flickering LEDs 66A1, 66A2 and LEDs 66B without consideration of the light level information. In embodiments, as noted above, each of the repellant portion 10, the flickering LEDs 66A1, 66A2 and LEDs 66B may be activated independently, if desired, based on operation of, or the position of, the power button 80 and/or light level information provided by the light sensor. In embodiments, as noted above, other input elements may provide information to control the repellant portion 10, the flickering LEDs 66A1, 66A2 and LEDs 66B. In embodiments, the repellant device 100, 200, 300, 400 may be placed in an off mode in which all of the repellant portion 10, the flickering LEDs 66A1, 66A2 and LEDs 66B are deactivated and stay that way regardless of light sensor information until activation of the power button 80 or another input.

One advantage of the repellant device 100, 200, 300, 400 is that it repels insects by providing a substantially pest free area around the device 100, 200, 300, 400 including a cloud of vaporized repellant while also provide an aesthetically pleasing light source that provides reliable light and is not subject to environmental conditions. In embodiments, one advantage of the device 400 is that it may be recharged via solar cells S which may allow for powering the lighting element 12 and the replant portion 10 without the need for an external power source. For convenience, the device 400 may be recharges via a USB port.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. An insect repellant device comprising:

a repellant portion, the repellant portion including insect repellant and configured to disperse vaporized insect repellant around the insect repellant device;

a light portion mounted on top of the repellant portion, the light portion including a plurality of flickering light sources configured to simulate a flame; and a control circuit operably connected to the repellant portion and the light portion to control activation of the repellant portion to provide vaporized insect repellant and the plurality of flickering light sources to provide light.

2. The insect repellant device of claim 1, further comprising a power source operably connected to one or more of the control circuit, the light portion and the repellant portion.

3. The insect repellant device of claim 1, wherein the plurality of flickering light sources include:

a first group of flickering light sources that are controlled by the control circuit to turn on and off together;

a second group of flickering light sources that are controlled by the control circuit to dim and brighten together, wherein the second group of flickering light sources are positioned below the first group of flickering light sources.

4. The insect repellant device of claim 3, wherein the light portion includes at least one constant light source configured to provide substantially constant light.

5. The insect repellant device of claim 4, wherein the control circuit is operably connected to the plurality of flickering light sources and the at least one constant light source to activate the flickering light sources to simulate the flame while the constant light source is off.

6. The insect repellant device of claim 4, wherein the control circuit is operably connected to the flickering light sources and the at least one constant light source to activate the constant light source to provide constant light while the plurality of flickering light sources are off.

7. The insect repellant device of claim 1, wherein the repellant portion includes:

a repellant housing;

a heating element mounted in the repellant housing;

a power terminal mounted in the repellant housing and electrically connected to the heating element;

an insect repellant cartridge including insect repellent mounted in the repellant housing, the insect repelling cartridge including:

a top portion configured to be received in an opening formed in the repellant housing; and a wick extending above the top portion and in contact with the insect repellant, wherein a top of the wick is positioned adjacent to the heating element.

8. The insect repellant device of claim 7, further comprising a base provided between the post and the repellant portion, wherein the repellant portion is removably mounted on the base to allow access to the insect repellent cartridge.

9. The insect repellant device of claim 8, further comprising at least one release button provided in the base and configured to allow separation of the base and the repellant portion.

10. An insect repellant device comprising:

a stand;

a repellant portion mounted on the stand and including an insect repellent and configured to disperse vaporized insect repellent around the insect repellant device;

a light portion mounted on top of the repellant portion, the light portion including a plurality of flickering light sources configured to simulate a flame; and a control circuit operably connected to the repellant portion and the light portion to control activation of the repellant portion to provide vaporized insect repellent and the plurality of flickering light sources to provide light.

11. The insect repellant device of claim 10, further comprising at least one power source operably connected to one or more of the control circuit, the light portion and the repellant portion.

12. The insect repellant device of claim 10, wherein the plurality of flickering light sources include:

a first group of flickering light sources that are controlled by the control circuit to turn on and off together; and a second group of flickering light sources that are controlled by the control circuit to dim and brighten together, wherein the second group of flickering light sources are positioned below the first group of flickering light sources.

13. The insect repellant device of claim 12, wherein the light portion further comprises at least one constant light source configured to provide substantially constant light.

14. The insect repellant device of claim 13, wherein the control circuit is operably connected to the plurality of flickering light sources and the at least one constant light source to activate the flickering light sources to simulate the flame while the constant light source is off.

15. The insect repellant device of claim 13, wherein the control circuit is operably connected to the flickering light sources and the at least one constant light source to activate the constant light source to provide constant light while the plurality of flickering light sources are off.

16. The insect repellant device of claim 10, wherein the repellant portion includes:

a repellant housing;

a heating element mounted in the repellant housing;

a power terminal mounted in the repellant housing and electrically connected to the heating element;

an insect repellant cartridge including insect repellant mounted in the repellant housing, the insect repelling cartridge including:

a top portion configured to be received in an opening formed in the repellant housing; and a wick extending above the top portion and in contact with the insect repellant, wherein a top of the wick is positioned adjacent to the heating element.

17. An insect repellant device comprising:

a deck clip;

a repellant portion including an insect repellant and configured to disperse vaporized insect repellant around the insect repellant device;

a light portion mounted on top of the repellant portion, the light portion including a plurality of flickering light sources configured to simulate a flame; and a control circuit operably connected to the repellant portion and the light portion to control activation of the repellant portion to provide vaporized insect repellent and the plurality of flickering light sources to provide light.

18. The insect repellant device of claim 17, wherein the plurality of flickering light sources include:

a first group of flickering light sources that are controlled by the control circuit to turn on and off together; and a second group of flickering light sources that are controlled by the control circuit to dim and brighten together, wherein the second group of flickering light sources are positioned below the first group of flickering light sources.

19. The insect repellant device of claim 17, wherein the light portion further comprises at least one constant light source configured to provide substantially constant light.

20. The insect repellant device of claim 19, wherein the control circuit is operably connected to the plurality of flickering light sources and the at least one constant light source to activate the flickering light sources to simulate the flame while the constant light source is off.

21. The insect repellant device of claim 19, wherein the control circuit is operably connected to the flickering light sources and the at least one constant light source to activate the constant light source to provide constant light while the plurality of flickering light sources are off.

* * * * *